3,294,523
VEGETATION GROWTH PROMOTER UTILISING BLOOD AS A MAJOR COMPONENT
Robert P. Morningstar, P.O. Box Drawer 427, Milford, Pa. 18337
No Drawing. Filed Jan. 29, 1964, Ser. No. 341,108
8 Claims. (Cl. 71—17)

This invention relates to a vegetation growth promoter additive composition for a fertilizer and to a fertilizer embodying such an additive composition.

The prime object of my invention is the provision of an additive for a fertilizer which acts to accelerate the germination of the planted seed and for imparting strength to the growing plant.

I have found that the assimilation of fertilizers is rapidly speeded up, and consequently the germination of seeds and the growth of plants are strongly promoted by the addition to fertilizers of a composition comprising a cold-water-swellable gum and dehydrated blood. In this composition, the water-swellable gum acts as a water absorber and retainer and as a protective colloid, coagulation of the moistened, dehydrated blood being prevented by the gum, while its decomposition is accelerated.

I have further found that this composition of a cold-water-swellable gum and dehydrated blood is particularly advantageous in combination with a comminuted burned mineral, particularly kiln dried or burned slate, the burned slate serving as an aerator for the soil, thereby promoting moisture absorption and filtration. If the soil is found to be absorbent, then the use of the added burned mineral is not critical or necessary but the soil is enhanced by its addition.

These additive compositions may desirably be compounded with other ingredients, e.g. wetting agents, and water binders such as magnesium sulphate and anti-caking agents such as silica-gel.

One of the preferred compositions for indoor and outdoor plants comprises the preparation of a mixture of dry cold-water-swellable gum, dehydrated blood, burned mineral and magnesium sulphate, with small amounts of a surface active agent, copper sulphate and silica-gel.

The composition of the gum and dehydrated blood, with or without the comminuted burned slate, may be first compounded as a separate mix, and then blended, as an additive, with fertilizer ingredients, or the separate components of the composition may be mixed with the fertilizer ingredients, the latter comprising such fertilizer materials as urea, potassium nitrate, bone meal and lime.

The activity of these fertilizer additive compositions of the invention is far greater than that of other fertilizers, for I have found that with the use thereof, seeds will germinate in the summertime within a week to ten days and plants set out in rows for cultivation will attain their early maturity within three to four weeks. I have also found that in addition to accelerating the germination of the seed, the additive composition imparts strength to assist the growing plant to set up resistance against insect attack. It is my observation that the added strength and virile growth of the plant that is imparted thereto enables the same to withstand infestations, resistance against insect attack being thus accomplished without recourse to pesticides.

The cold-water-swellable gums which I prefer to use in the additive composition are gum guar and gum karaya, these being preferred because of their ability to absorb high percentages of moisture and to retain the same for long periods of time. These materials form very smooth gels and act as protective colloids in the composition. In combination with dehydrated blood, these gums serve, as indicated above, to accelerate the decomposition of the dehydrated blood while preventing the coagulation thereof. They also are capable of retaining moisture without coalescing with the dehydrated blood (which is in a dissolved state). Other water-swellable and water retainable carbohydrates may be employed in substitution for these gums.

When a comminuted burned mineral is used in the composition, I prefer to employ a kiln dried slate (burned at temperatures close to 2000° F.) known as "Penlite." This material is a burned aluminum silicate, with up to 10% each of calcium, magnesium and iron oxides or carbonates. This material is employed because of its ability to aerate the soil, thereby maintaining a moisture condition near and around the root system of the plant, while its chemical make-up closely approaches the ideal elements of fertilizers. This material is used in a comminuted state, being ground very fine up to 100 mesh.

In the combination, the water-swellable gum forms a protective colloidal gel around the roots, the burned mineral portion preventing compacting, thereby allowing ample breathing by the soil. An incidental but important result also has been found to be that losses due to deep freezing are negligible.

The proportions of the ingredients of the additive compositions depend in general on the absorptive property of the water-swellable gum. In compositions comprising the gum and the dehydrated blood, the gum is employed in a minor proportion and the dehydrated blood in a major proportion. Where gum guar is used in the composition, due to its greater capacity for swelling and water absorption, a lesser relative proportion is used than when gum karaya (which possesses a lower degree of swellability) is employed. When comminuted burned slate is employed in said composition, it is generally employed in a proportion equal to that of the combined gum and dehydrated blood in the composition. When the composition, absent the burned slate, is compounded with other fertilizers, it is used generally in the proportion of 20% of the total fertilizer compound, the burned slate when used being also employed in about the same 20% proportion.

The following examples of the compositions of the invention show the compounding thereof both as an additive composition for a fertilizer and for a fertilizer employing the ingredients of the additive composition. In these examples all parts are given by weight. The process of compounding comprises the mixing or blending of the described ingredients.

Examples I to III illustrate the composition comprising the mixture of the water-swellable gum or gums and dehydrated blood; Example IV illustrates the composition with the added comminuted burned slate; Example V is a preferred example of the composition of Example I; and Example VI illustrates the compounding of the additive composition with other fertilizer materials.

*Example I*

| Ingredients: | Parts |
|---|---|
| Gum karaya | 9 |
| Gum guar | 9 |
| Dehydrated blood | 82 |
| | 100 |

*Example II*

| Ingredients: | Parts |
|---|---|
| Gum guar | 8 |
| Dehydrated blood | 92 |
| | 100 |

Example III

| Ingredients: | Parts |
|---|---|
| Gum karaya | 30 |
| Dehydrated blood | 70 |
| | 100 |

Example IV

| Ingredients: | Parts |
|---|---|
| Gum guar | 4 |
| Dehydrated blood | 46 |
| Comminuted burned slate | 50 |
| | 100 |

Example V

| Ingredients: | Parts |
|---|---|
| Gum guar | 8 |
| Gum karaya | 8 |
| Dehydrated blood | 72 |
| Magnesium sulphate | 7 |
| Nonionic surface active agent | 3 |
| Silica gel powder | 1 |
| Copper sulphate | 1 |
| | 100 |

Example VI

| Ingredients: | Parts |
|---|---|
| Example V product | 18 |
| Urea | 13 |
| Bone meal | 28 |
| Hydrated lime | 22 |
| Copper sulfate | 1 |
| Comminuted burned slate | 18 |
| | 100 |

The vegetation growth promoter of the present invention as an additive composition and as a mix component for a fertilizer, the manner of compounding the same, and the functional advantages in the use thereof, will it is believed, be fully apparent from the foregoing description thereof. It will be further apparent that changes may be made thereto in substitute materials, proportions and use without departing from the spirit of the invention defined in the following claims.

I claim:

1. A vegetation growth promoter fertilizer additive composition comprising the admixture, by weight, of the following ingredients:

| | Parts |
|---|---|
| Gum karaya | 9 |
| Gum guar | 9 |
| Dehydrated blood | 82 |

2. A vegetation growth promoter fertilizer additive fertilizer additive composition comprising the admixture, by weight, of the following ingredients:

| | Parts |
|---|---|
| Gum guar | 4 |
| Dehydrated blood | 46 |
| Comminuted burned slate | 50 |

3. A vegetation growth promoter fertilizer additive composition comprising the admixture, in parts by weight, of the following ingredients:

| | Parts |
|---|---|
| Gum guar | 8 |
| Gum karaya | 8 |
| Dehydrated blood | 72 |
| Magnesium sulfate | 7 |
| Nonionic surface active agent | 3 |
| Silica gel powder | 1 |
| Copper sulphate | 1 |

4. A vegetation growth promoter fertilizer additive composition comprising a mixture of a water-swellable gum and dehydrated blood, the water-swellable gum, acting as a water absorber and retainer and as a protective colloid for the composition, being in a minor proportion, and the dehydrated blood being in a major proportion, in the composition.

5. A vegetation growth promoter fertilizer additive composition according to claim 4, in which the water-swellable gum is selected from the class consisting of gum karaya and gum guar.

6. A vegetation growth promoter fertilizer additive composition comprising a mixture of a water-swellable gum, dehydrated blood and comminuted burned slate, the water-swellable gum, acting as a water absorber and retainer and a protective colloid for the composition, and the comminuted burned slate acting as an aerator for the soil, thereby promoting moisture absorption and filtration.

7. The vegetation growth promoter of claim 6, in which the water-swellable gum is in a minor proportion and the dehydrated blood and comminuted burned slate are together in a major proportion in the composition, the said comminuted burned slate comprising burned aluminum silicate with a proportion of calcium, magnesium and iron oxides.

8. A vegetation growth promoter fertilizer composition comprising the admixture, in parts by weight, of 18 parts of the following composition:

| | Parts |
|---|---|
| Gum guar | 8 |
| Gum karaya | 8 |
| Dehydrated blood | 72 |
| Magnesium sulfate | 7 |
| Nonionic surface active agent | 3 |
| Silica gel powder | 1 |
| Copper sulphate | 1 | with the following fertilizer materials:

| | Parts |
|---|---|
| Urea | 13 |
| Bone meal | 28 |
| Hydrated lime | 22 |
| Comminuted burned slate | 18 |
| Copper sulphate | 1 |

References Cited by the Examiner

UNITED STATES PATENTS

| 141,853 | 8/1873 | Coe | 71—17 |
|---|---|---|---|
| 241,463 | 5/1881 | Werdermann | 71—17 |
| 2,171,428 | 8/1939 | Griffith et al. | 99—21 |
| 3,102,804 | 9/1963 | Engelhart | 71—17 |

DONALL H. SYLVESTER, *Primary Examiner.*

ANTHONY SCIAMANNA, J. H. NEWSOME,
*Assistant Examiners.*